United States Patent
Itsuji et al.

(10) Patent No.: US 6,835,925 B2
(45) Date of Patent: Dec. 28, 2004

(54) SIGNAL DETECTOR AND PROBE MICROSCOPE USING THE SAME

(75) Inventors: Takeaki Itsuji, Kanagawa (JP); Shunichi Shido, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 10/118,957

(22) Filed: Apr. 10, 2002

(65) Prior Publication Data

US 2002/0148954 A1 Oct. 17, 2002

(30) Foreign Application Priority Data

Apr. 17, 2001 (JP) .................................... 2001-118241

(51) Int. Cl.⁷ ................................................ H01J 5/16
(52) U.S. Cl. ........................................ 250/234; 73/105
(58) Field of Search ...................... 73/105; 369/53.44, 369/60.01; 250/234, 216

(56) References Cited

U.S. PATENT DOCUMENTS

| | | | |
|---|---|---|---|
| 5,299,184 A | 3/1994 | Yamano et al. | 369/44.28 |
| 5,329,122 A | 7/1994 | Sakai et al. | 250/306 |
| 5,371,727 A | 12/1994 | Shido et al. | 369/124 |
| 5,485,451 A | 1/1996 | Yamano et al. | 369/126 |
| 5,526,334 A | 6/1996 | Yamano et al. | 369/53 |
| 5,535,018 A | 7/1996 | Yamano et al. | 358/444 |
| 5,831,961 A | 11/1998 | Sakai et al. | 369/126 |
| 5,966,053 A | * 10/1999 | Durig et al. | 331/116 M |
| 6,037,814 A | * 3/2000 | Hirakawa | 327/156 |
| 6,072,764 A | 6/2000 | Shido et al. | 369/126 |

OTHER PUBLICATIONS

Kitamura, et al., "High–Resolution Imaging of Contact Potential Difference with Ultrahigh Vacuum Noncontact Atomic Force Microscope," *Appl. Phys. Lett.*, vol. 72, No. 24, Jun. 15, 1998.

* cited by examiner

*Primary Examiner*—Thanh X. Luu
*Assistant Examiner*—Stephen Yam
(74) *Attorney, Agent, or Firm*—Fitzpatrick, Cella, Harper & Scinto

(57) ABSTRACT

A signal detector comprises a frequency changing circuit adapted to receive an electric signal having a frequency modulated from a first reference frequency $f_1$ with a modulation width $\Delta f$ as input, convert the received electric signal to an electric signal having a second reference frequency $f_2$ lower than the first reference frequency $f_1$ and output the converted electric signal and a frequency/voltage conversion circuit adapted to receive the output of the frequency changing circuit as input and output a voltage corresponding to the ratio of the modulation width $\Delta f$ to the second reference frequency $f_2$ and an electric signal having a frequency modulated from a reference frequency $Nf_2$ with a modulation width of $N\Delta f$ (N: integer).

8 Claims, 4 Drawing Sheets

SIGNAL DETECTOR AND PROBE MICROSCOPE USING THE SAME

BACKGROUND OF THE INVENTION

1. Field of the Invention

This invention relates to a signal detector using a scanning probe and also to a probe microscope using such a signal detector.

2. Related Background Art

Since the invention of scanning tunneling microscope (STM) that allows the observer to directly observe the electronic structure of a conductor, microscopes adapted to acquire various pieces of information and their distribution patterns from an object have been developed in recent years. With such microscopes, information is obtained by scanning the object by means of a pointed probe. Such microscopes include atomic force microscopes (AFMs), scanning capacity microscopes (SCaMs) and near field optical microscopes (SNOMs). At present these microscopes are collectively referred to as scanning probe microscopes (SPMs) and widely used as means for observing microstructures with a resolution of the level of atoms and molecules.

An AFM is a microscope adapted to observe micro-undulations on the surface of a specimen by detecting the warp of a probe produced by atomic force. AFMs provide a wide scope of application because the AFM allows observing an insulator without problem unlike the STM through which only a conductor can be observed. Thus, they are attracting attention as they can be used for atomic/molecular manipulators of the next generation. A number of reports have been made on them.

Among others, non-contact atomic force microscopes (ncAFMs) adapted to observe the surface profile of a specimen in a non-contact region (attractive force region) without any physical contact between the front end of the probe and the surface of the specimen are known. The ncAFM is designed to oscillate the probe at a resonance point and detect the amount of shift of the resonance frequency of the probe due to the physical interaction between the surface of the specimen and the probe tip (atomic force and molecular force between the probe tip and the specimen surface) so as to allow observation of the surface profile of the specimen. Since the observation using an ncAFM is conducted in a non-contact region, any adverse effect of contact of the probe tip and the specimen surface can be avoided. For this reason, a broader application of ncAFMs as atomic and molecular manipulators is expected than ever.

In the ncAFM, the signal obtained by the probe is a signal subjected to frequency modulation. The reference frequency is the resonance frequency of the probe and the modulation, or the frequency shift $\Delta f$, represents the obtained surface information.

The FM detection technology using a PLL (phase locked loop) is widely used as a technology for detecting the amount of frequency shift (Shinlichi Kitamura and Masashi Iwasaki; Appl. Phys. Lett., Vol. 72, No. 24, 15 June 1998).

A circuit adapted to receive a signal subjected to a frequency shift as input signal in a detection system using a PLL, generate a reference signal having a frequency same as the resonance frequency of the probe in the detection system, detect the phase difference between the input signal and the reference signal and convert the phase difference into a voltage is known.

A phase delay occurs when the frequency of the input signal is lower than that of the reference signal, whereas a phase advance takes place when the frequency of the input signal is higher than the frequency of the reference signal. Therefore, the output of the detection system relative to the frequency of the input signal shows a voltage change before and after the reference signal frequency $f_0$ as shown in FIG. 7 of the accompanying drawings. The width of the change between fun and fox in FIG. 7 is determined by the reference signal frequency located at the middle of the frequency change due to the principle of detection of phase difference. Therefore, when the reference signal frequency is high, both $f_{min}$ and $f_{max}$ become high accordingly. Thus, the expected amplitude of the detection signal when the width of modulation of the input signal is $\Delta f$ is substantially equal to the value determined by the ratio of the amount of frequency shift $\Delta f$ relative to the reference signal frequency located at the middle ($\Delta f/f_0$)

Meanwhile, in the ncAFM, the probe is oscillated at the resonance point of the probe and the amount of frequency shift is detected at the resonance point for the observation of the surface of the specimen. While a frequency between several times of 10 kHz and several times of 100 kHz is popularly used for the resonance frequency of the probe, a probe having a relatively high resonance frequency is popularly used for the purpose of raising the scanning frequency to be used for observation and minimizing the influence of external noises. However, the amount of frequency shift of the resonance frequency that is detected as a signal representing the surface profile of the specimen is between several Hz and several times of 100 Hz and hence very small if compared with the resonance frequency of the probe. For this reason, a highly sensitive detection system is required for detecting the fluctuations of such a small amount of frequency shift. Additionally, when a PLL is used for detecting the fluctuations of the frequency, the frequency stability of the VCO (voltage control oscillator) becomes a problem, particularly a serious noise problem, when detecting such small frequency fluctuations are to be detected. Furthermore, the output frequency of the ncAFM for the input control voltage of the VCO can, if partly, not necessarily be linear. If the shift of the resonance point of the probe is detected in the part that is not linear, the image obtained as a result of the observation may not correctly reflect the surface profile of the specimen.

For detecting a frequency signal with such a high sensitivity, a large output value may be obtained relative to the frequency fluctuations that are input to the detection system by increasing the inclination of the graph of FIG. 7. Ideally, inclination is so regulated as to be able to obtain $V_{max}$ (maximum output voltage of the detection system) for the amount of frequency shift $\Delta f$ by regulating the resonance frequency of the probe to the $f_o$ point. However, as pointed out earlier, the resonance frequency of the probe is between several times of 10K and several times of 100 KHz and can vary from probe to probe even among the probes prepared through a same process. The variance is significantly larger than the amount of frequency shift of the resonance point. Therefore, if the probe is replaced and the detection system is used to detect signals without being regulated for the new probe, it may sometimes be impossible to detect the amount of shift of the resonance point because the $f_0$ point is shifted to allow the signal to overflow. For this reason, the efficiency of the operation of replacing the probe has been poor because the replacement requires the values of the elements of the circuits of the detection system that have been regulated before to be changed and regulated for another time.

In view of the above described circumstances, it is therefore the object of the present invention to dissolve the above identified problems by providing a signal detector comprising a scanning probe that can raise the ratio of the amount of frequency shift relative to the resonance frequency of the probe and can accommodate variance of the resonance frequency of different probes. Another object to the present invention is to provide a probe microscope using such a signal detector.

SUMMARY OF THE INVENTION

In an aspect of the invention, the first object of the invention is achieved by providing a signal detector comprising:

a frequency changing circuit adapted to receive an electric signal having a frequency modulated from a first reference frequency $f_1$ with a modulation width $\Delta f$ as input, convert the received electric signal to an electric signal having a second reference frequency $f_2$ lower than the reference frequency $f_1$ and output the converted electric signal; and a frequency/voltage conversion circuit adapted to receive the output of said frequency changing circuit as input and output a voltage signal corresponding to the ratio of the modulation width $\Delta f$ to the second reference frequency $f_2$ and an electric signal having a frequency modulated from a reference frequency $Nf_2$ with a modulation width of $N\Delta f$ (N: integer).

In another aspect of the invention, there is provided a signal detector using a scanning probe, said detector comprising:

a probe having a tip at the front end thereof;

a means for oscillating the probe;

a means for detecting the oscillation of the probe and converting it into an electric signal; and a means for detecting the signal representing the amount of shift of the resonance frequency of the probe due to the physical interaction between the tip of the probe and the surface of the specimen held in a non-contact state relative to the probe out of the electric signal, said means for detecting the signal representing the amount of shift of the resonance frequency including:

a frequency changing circuit adapted to receive the electric signal as input and convert it into an electric signal having a lower frequency without changing the signal representing the amount of shift of the resonance frequency; and a frequency/voltage conversion circuit adapted to receive the electric signal having the lower frequency converted by the frequency changing circuit as input, convert it into a voltage corresponding to the signal representing the amount of shift of the resonance frequency and output the voltage.

DETAILED DESCRIPTION OF THE PREFERRED EMBODIMENTS

Now, the present invention will be described in greater detail by referring to the accompanying drawings.

Figure 1:
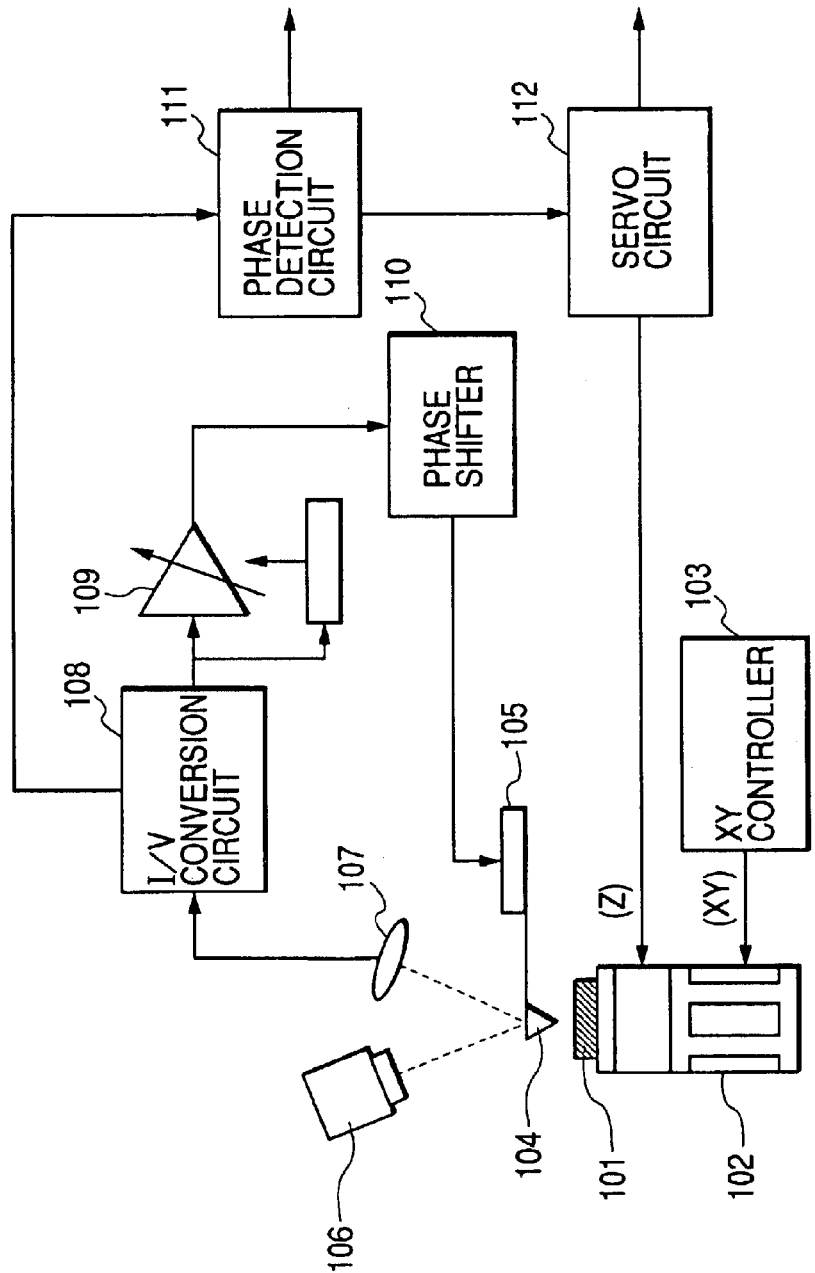
FIG. 1 is a schematic block diagram of a non-contact atomic force microscope (ncAFM) of an embodiment of the invention that is used in Example 1.

FIG. 1 is a schematic block diagram of a non-contact atomic force microscope (ncAFM) of an embodiment of the invention that comprises a scanner 102, an XY controller 103, a probe 104, an actuator 105, a laser diode 106, a photoelectric converter 107, an I/V conversion circuit 108, a gain control circuit 109, a phase shifter 110, a phase detection circuit 111 and a servo circuit 112.

For observing the surface of a specimen 101, it is scanned in XY (plane) directions by means of the scanner 102 according to the scanning signal output from the XY controller 103. At this time, the probe 104 is oscillated at the resonance point by the actuator 105.

The oscillation of the probe 104 is detected by a so-called optical lever system that irradiates the front end of the probe 104 with a laser beam from the laser diode 106, receives the reflected beam by means of the photoelectric converter 107 and converts the received beam into a voltage signal by means of the I/V conversion circuit 108. Note, however, that the method for detecting the oscillation of the tip of the probe 104 is not limited to the use of an optical lever system.

The detected voltage signal is regulated to show a constant amplitude value by the gain control circuit 109 and transmitted to the actuator 105 by way of the phase shifter 110. The phase shifter 110 is adapted to an operation of feed forward control of promoting the oscillation of the probe at the resonance point by making the phase of the voltage signal transmitted to the actuator 105 match the phase of the oscillation of the probe 104.

If the resonance point is caused to fluctuate by the external force (e.g., atomic force) that is applied to the front end of the probe 104, the feed forward control operation makes it possible for the probe 104 to resonate at the changed resonance point.

The information on the shift of the resonance point is detected by the phase detection circuit 111 as a voltage signal that corresponds to the information on the shift of the frequency of the resonance point of the probe 104. The servo circuit 112 controls the distance between the probe 104 and the specimen 101 by moving the scanner 102 in the Z-direction (vertical direction) according to the output of the phase detection circuit 111 so as to make the amount of frequency shift show a constant value. The value controlled by the servo circuit 112 is used to produce an observed visual image of the surface profile of the specimen 101.

Figure 2:
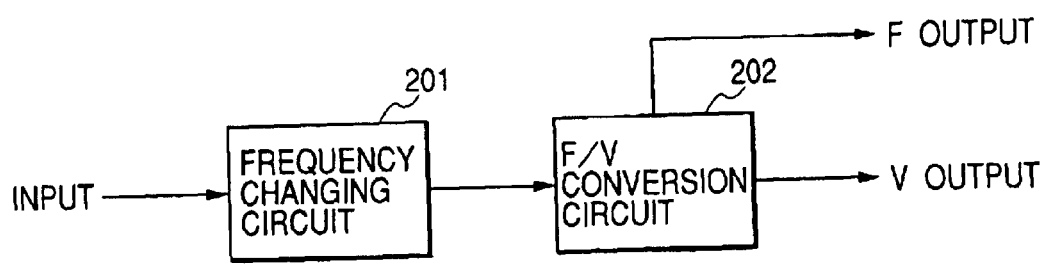
FIG. 2 is a schematic circuit diagram of the phase detection circuit of an embodiment of the invention that is used in Example 1.

According to the invention, the phase detection circuit 111 is formed by a frequency changing circuit 201 and a frequency/voltage (F/V) conversion circuit 202 as shown in FIG. 2.

The frequency changing circuit 201 converts the voltage signal obtained as a result of the oscillation of the probe to a signal with a lower frequency. Note that this conversion is such that the difference between the frequency before the conversion and the frequency after the conversion is always held to a constant value regardless of the frequency before the conversion. In other words, the frequency changing circuit 201 changes the frequency before the conversion to the lower frequency side by a constant frequency value regardless if the signal before the conversion is accompanied by a frequency shift due to the undulations of the surface of the specimen.

Figure 3:
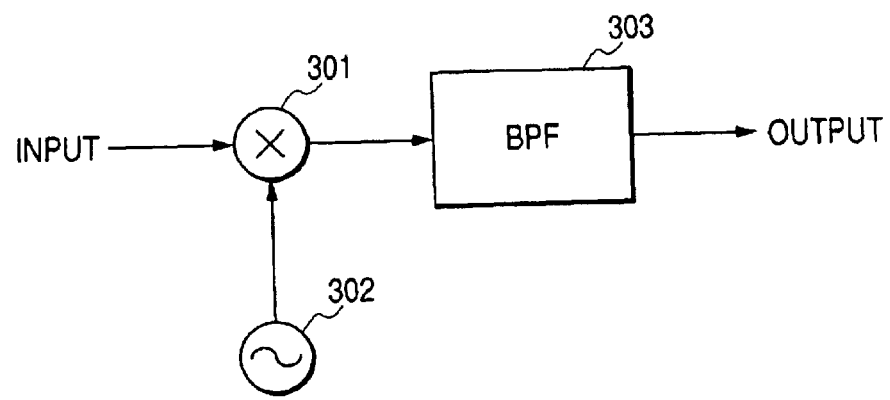
FIG. 3 is a schematic circuit diagram of the frequency changing circuit of an embodiment of the invention that is used in Example 1.

Preferably, the frequency changing circuit 201 is a heterodyne frequency changing circuit comprising a multiplier 301, a reference signal generator 302 and a BPF (band pass filter) 303 as shown in FIG. 3.

The multiplier 301 receives the output signal (frequency $f_1-\Delta f$) of the I/V conversion circuit 108 that detects the oscillation of the probe 104 and the reference signal (frequency $F_{OSC}$) generated by the reference signal generator 302 as input and outputs the product of multiplication of the input signals. As shown in formula (1) below, the output signal contains a high frequency oscillation component with a frequency of $f_1-\Delta f+F_{OSC}$ and a low frequency oscillation component with a frequency of $f_1-\Delta f-F_{OSC}$.

$$\sin(2\pi[f_1-\Delta f]t)\times\sin(2\pi F_{OSC}t)=(1/2)\times\{\cos(2\pi[f_3+F_{OSC}-\Delta f]t)-\cos(2\pi[f_1-F_{OSC}-\Delta f]t)\} \quad (1)$$

$f_1$: resonance frequency of probe 104

$\Delta f$: frequency shift amount of probe 104

$F_{OSC}$: reference signal generated by reference signal generator 302

The output of the multiplier 301 is input to the BPF 303 and only the oscillation component of the low frequency $(f_1-\Delta f-F_{OSC})$ side is taken out.

Figure 6:
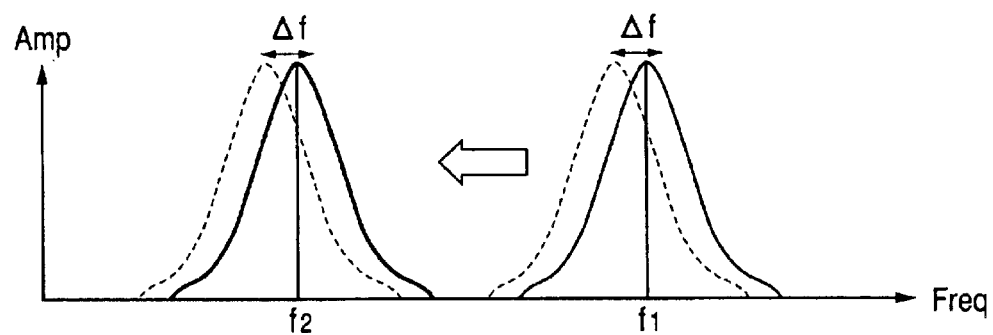
FIG. 6 is a graph illustrating the operation of the frequency changing circuit of an embodiment of the invention.
Figure 7:
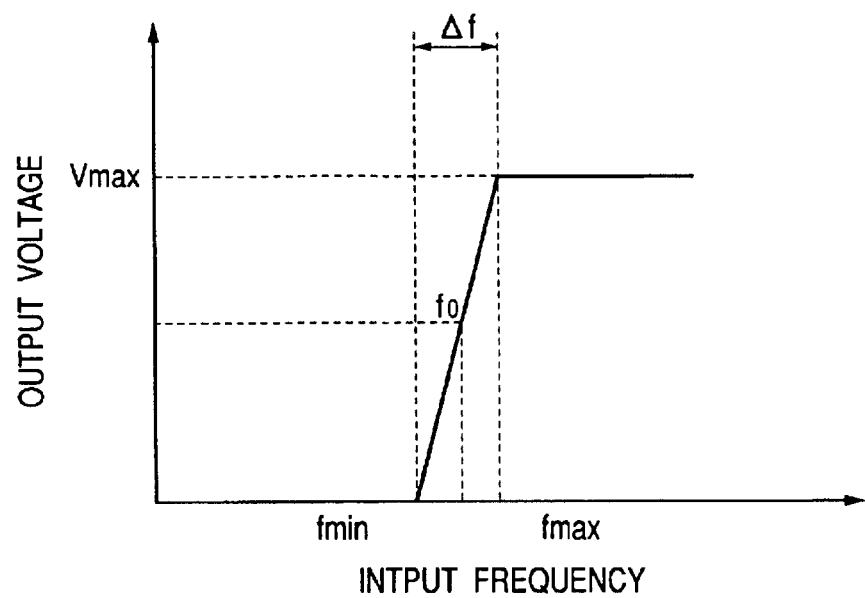
FIG. 7 is a graph illustrating the relationship of the input frequency and the output voltage of a frequency detection system.

In this way, the frequency changing circuit 201 converts the information on the resonance frequency $f_1$ of the probe into a lower frequency $f_2$ without changing the information on the amount of frequency shift $\Delta f$ (FIG. 6). At this time, since the information on the amount of frequency shift $\Delta f$ does not change, a signal obtained by subjecting the reference frequency $f_2$ to a frequency modulation of $\Delta f$ is produced as signal after the conversion. Then, the signal ratio, or $\Delta f/f_2$, is increased if compared with the one before the conversion.

Figure 4:
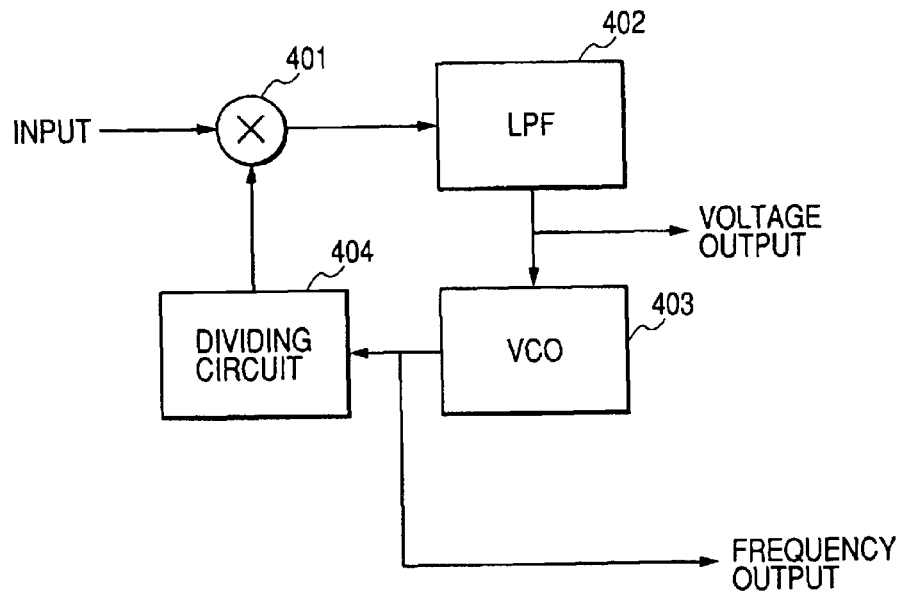
FIG. 4 is a schematic circuit diagram of the F/V conversion circuit of an embodiment of the invention that is used in Example 1.

The F/V conversion circuit 202 converts the frequency signal representing the amount of frequency shift of the probe 104 whose signal intensity has been raised by the frequency changing circuit 201. While this embodiment adopts a system configuration of PLL (phase locked loop) as shown in FIG. 4, the present invention is by no means limited to such a configuration. The signal output from the frequency changing circuit 201 is firstly input to phase comparator 401, where the phase difference between itself and the reference signal output from frequency dividing circuit 404 is detected. The signal representing the phase difference is smoothed by LPF 402, which produces an output signal that corresponds to the amount of frequency shift of the F/V conversion circuit 202.

The output signal is used as control signal of VCO (voltage controlled oscillator) 403. The VCO 403 is a circuit that outputs a signal whose frequency is made equal to N times of the output signal of the frequency changing circuit 201 that is input to the phase comparator 401 by the control signal. Thus, the VCO 403 outputs a signal whose frequency is equal to N times of the frequency of the signal to be compared and the frequency dividing circuit 404 divides the output of the VCO by N and feeds it back to the phase comparator 401 as reference signal. A part of the output signal of the VCO 403 that is highly linear can be used for observation by using the frequency dividing circuit 404. It is also possible for the VCO 403 to externally output a signal whose frequency is multiplied by N by itself.

Thus, a signal detector according to the invention shows improved signal sensitivity because the signal ratio of the $\Delta f$ component is raised by the frequency changing circuit 201 before the signal is input to the F/V conversion circuit 202 in the phase detection circuit 111.

Additionally, if the resonance frequency is changed by replacing the probe, the reference signal frequency $F_{OSC}$ of the frequency changing circuit 201 is regulated so that no downstream operation is required to regulate the F/V conversion circuit 202. When the F/V conversion circuit 202 is responsible for regulating the fluctuations of the resonance frequency in conventional signal detectors that do not comprise a frequency changing circuit 201, the regulating operation of the F/V conversion circuit 202 is a complex one because both the circuit parameters of the phase detection circuit and those of the VCO need to be changed. With the method according to the invention, to the contrary, the regulating operation necessary for signal detection is simplified and the variance of the resonance frequency of each probe can be accommodated with ease.

Now, the present invention will be described by way of Examples.

EXAMPLE 1

An ncAFM apparatus having a configuration as shown in FIG. 1 was used in Example 1. The probe 104 of the apparatus showed a resonance frequency of 380 kHz and a Q value of 400. The Q value represents the sharpness of the oscillation system. The actuator 105 was that of piezoelectric ceramic and the photoelectric converter 107 was a quartered photodiode. A piezoelectric scanner was used for the scanner 102 and operated for scanning in plane directions (XY directions) under the control of the XY controller 103. It was controlled for the vertical direction (Z direction) by the control signal from a servo circuit.

The phase detection circuit 111 was formed by using a frequency changing circuit 201 and a F/V conversion circuit 202 as shown in FIG. 2, of which the frequency changing circuit 201 had a configuration as shown information in FIG. 3 while the F/V conversion circuit 202 was configured in a manner as shown in FIG. 4. A packaged IC (PDJ-100B: tradename, available from DATEL) was used for the multiplier 301 and the BPF 303 shown in FIG. 3 and a function generator was used for the reference signal generator 302. A packaged IC (74VHC4046: tradename, available from Fairchild Semiconductor) was used for the phase comparator 401 and the VCO 403 shown in FIG. 4. The frequency dividing circuit 404 was an up/down counter (74169: tradename, available from TEXAS INSTRUMENTS), which was used, however, only as down counter in this example. A lag lead type LPF was used for the LPF 402 in order to avoid oscillation of the F/V conversion circuit 202.

In this example, the reference signal generator 302 was driven to generate a reference signal of 379 KHz ($F_{OSC}$ in formula (1)) and the frequency changing circuit 201 was made to output the frequency component of 1 KHz ($f_1-F_{OSC}$) that was the difference between the resonance frequency of 380 KHz of the probe ($f_1$ in formula (1) and the frequency of the reference signal of 379 KHz and the amount of shift of the resonance frequency $\Delta f$. The F/V conversion circuit 202 used N=16 and obtained an output from the VCO 403 by multiplying the $\Delta f$ component by 16 for signal detection. The atomic force microscope of this example observed the undulations of the surface of the specimen with a resolution of about 1 nm.

EXAMPLE 2

Figure 5:
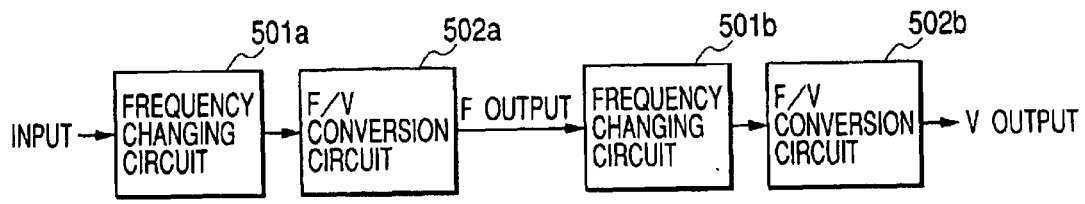
FIG. 5 is a schematic circuit diagram of the phase detection circuit that is used in Example 2.

In this example, a signal detector was realized by using a plurality of phase detection circuits 111 as shown in FIG. 5. Each of the frequency changing circuits 501a and 501b and each of the F/V conversion circuits 502a and 502b had respective configurations same as those of the frequency changing circuit 201 and the F/V conversion circuit 202 of Example 1. However, the F/V conversion circuit 502a was adapted to output not the control voltage of the VCO 403 but a frequency signal obtained by multiplying the signal input from the frequency changing circuit 501a by N. The amount of shift ($\Delta f$) of the resonance frequency (380 KHz) of the probe 104 was output from the frequency changing circuit 501a as a shift of 1 KHz as in the case of Example 1.

The F/V conversion circuit 502a was adapted to output a signal obtained by multiplying the output signal of the frequency changing circuit 501a by 16 (N=16), or an amount of shift of 16 KHz ($16\Delta f$). The second frequency changing circuit 501b was adapted to output a signal representing an amount of frequency shift of 1 KHz ($\Delta f$) obtained by reducing the amount of frequency shift of 16 KHz ($16\Delta f$). Under this condition, the reference signal of 15 KHz of the reference signal generator 302 was input to the multiplier 301. Then, the component $\Delta f$ was multiplied by 16 (N=16) by the multiplier 301 and the F/V conversion circuit 502b detected the signal. The atomic force microscope of this example observed the undulations of the surface of the specimen with a resolution of about 0.5 nm.

As described above, the present invention makes it possible to raise the signal ratio of the amount of shift of the resonance frequency of the probe to configure a system that can easily fend off noises.

Additionally, in the operation of phase detection, it is possible to fix the frequency of the signal input to the detection system always by changing the frequency of the reference signal so that the constants of the detection system do not need to be changed. Therefore, a signal detector according to the invention can accommodate any variance of the resonance frequency that may arise when a different probe is used to facilitate and simplify the regulating operation.

What is claimed is:

1. A signal detector comprising:
   a first frequency changing circuit adapted to receive an electric signal having a frequency modulated from a first reference of frequency $f_1$ with a modulation width $\Delta f$ as input, to convert the received electric signal to an electric signal having a second reference frequency $f_2$ lower than the first reference frequency $f_1$, and to output the converted electric signal;
   a first frequency/voltage conversion circuit adapted to receive the output of said first frequency changing circuit as input and output an electric signal having frequency modulated from a reference frequency $Nf_2$ with a modulation width of $N\Delta f$ (N: integer),
   a second frequency changing circuit adapted to receive said output of the first frequency/voltage conversion circuit as input, to convert the received electric signal to an electric signal having the reference frequency $f_2$ without changing the modulation width, and to output the converted electric signal; and
   a second frequency/voltage conversion circuit adapted to receive the output of said second frequency changing circuit as input and output a voltage signal corresponding to the ratio of the modulation width $N\Delta f$ to the reference frequency $f_2$, or $N\Delta f/f_2$.

2. The signal detector according to claim 1, wherein each of said first and second frequency changing circuits includes:
   a circuit for generating a reference signal of a predetermined frequency;
   a circuit for multiplying the input electric signal by the reference signal; and
   a band pass filter for selecting a low frequency component of the output of said multiplier.

3. The signal detector according to claim 2, wherein said predetermined frequency in the first frequency changing circuit is equal to the difference of $f_1$ and $f_2$ and said predetermined frequency in the second frequency changing circuit is equal to the difference of $Nf_2$ and $f_2$.

4. The signal detector according to claim 2, further comprising a means for changing said predetermined frequency.

5. The signal detector according to claim 1, wherein each of said first and second frequency/voltage conversion circuits includes:
   an oscillation circuit for externally controlling its oscillation frequency by means of a voltage;
   a frequency dividing circuit for dividing the frequency signal output from said oscillation circuit;
   a phase comparator for comparing the amount of frequency shift and the output of said frequency dividing circuit; and
   a low pass filter.

6. The signal detector according to claim 5, wherein said oscillation circuit in the first frequency/voltage conversion circuit is adapted to output said electric signal having a frequency modulated from a reference frequency $Nf_2$ with a modulation width of $N\Delta f$ and said low pass filter in the second frequency/voltage conversion circuit is adapted to output said voltage signal corresponding the ratio of the modulation width $N\Delta f$ to the reference frequency $f_2$, or $N\Delta f/f_2$.

7. A signal detector using a scanning probe, said detector comprising:
   a probe having a tip at a front end thereof;
   a means for oscillating the probe;
   a means for detecting the oscillation of the probe and converting it into an electric signal; and
   a means for detecting the signal representing an amount of shift of the resonance frequency of the probe due to a physical interaction between the tip of the probe and the surface of a specimen held in a non-contact state relative to the probe out of the electric signal,
   said means for detecting the signal representing the amount of shift of the resonance frequency including:
   a first frequency changing circuit adapted to receive the electric signal having a frequency modulated from a first reference frequency $f_1$ with a modulation width $\Delta f$ as input, to convert the received electric signal to an electric signal having a second reference frequency $f_2$ lower than the first reference frequency $f_1$, and to output the converted electric signal;
   a first frequency/voltage conversion circuit adapted to receive the output of said frequency changing circuit as input and to output an electric signal having a frequency modulated from a reference frequency $Nf_2$ with a modulation width of $N\Delta f$ (N: integer),
   a second frequency changing circuit adapted to receive said output of the first frequency/voltage conversion circuit as input, to convert the received electric signal to an electric signal having the reference frequency $f_2$ without changing the modulation width, and to output the converted electric signal; and
   a second frequency/voltage conversion circuit adapted to receive the output of said second frequency changing circuit as input and to output a voltage signal corresponding to the ratio of the modulation width $N\Delta f$ to the reference frequency $f_2$, or $N\Delta f/f_2$.

8. A scanning probe microscope comprising a signal detector according to claim 7.

* * * * *

UNITED STATES PATENT AND TRADEMARK OFFICE
CERTIFICATE OF CORRECTION

PATENT NO. : 6,835,925 B2
DATED : December 28, 2004
INVENTOR(S) : Takeaki Itsuji et al.

It is certified that error appears in the above-identified patent and that said Letters Patent is hereby corrected as shown below:

Column 1,
Line 56, "(Shinlichi" should read -- (Shin'ichi --.

Column 2,
Line 6, "fun and fox" should read -- $F_{min}$ and $F_{max}$ --.
Line 34, "detect-" should be deleted.
Line 35, "ing" should be deleted.
Line 66, "dissolve" should read -- solve --.

Column 5,
Line 20, "[$f_3$+$F_{osc}$" should read -- [$f_1$+$F_{osc}$ --.

Signed and Sealed this

Twenty-first Day of February, 2006

JON W. DUDAS
*Director of the United States Patent and Trademark Office*